United States Patent [19]

Wiltz

[11] Patent Number: 5,028,356
[45] Date of Patent: Jul. 2, 1991

[54] MULTI-LEVEL FILM FILL ASSEMBLY COOLING TOWER

[76] Inventor: Vincent Wiltz, P.O. Box 88, Krotz Springs, La. 70750

[21] Appl. No.: 496,171

[22] Filed: Mar. 19, 1990

Related U.S. Application Data

[63] Continuation of Ser. No. 174,349, Mar. 28, 1988, abandoned, which is a continuation-in-part of Ser. No. 71,781, Jul. 10, 1987, Pat. No. 4,781,869.

[51] Int. Cl.⁵ .............................................. B01F 3/04
[52] U.S. Cl. ................................... 261/109; 261/111; 261/DIG. 11; 261/112.2
[58] Field of Search ............ 261/DIG. 11, 109, 112.2, 261/111

[56] References Cited

U.S. PATENT DOCUMENTS

| | | | |
|---|---|---|---|
| 707,042 | 8/1902 | Wheeler et al. | 261/DIG. 11 |
| 2,512,271 | 6/1950 | Green | 261/DIG. 11 |
| 3,400,917 | 9/1968 | Richards | 261/DIG. 11 |
| 3,707,277 | 12/1972 | Phelps | 261/109 |
| 3,764,121 | 10/1973 | Fordyce | 261/DIG. 11 |
| 4,781,869 | 11/1988 | Wiltz | 261/DIG. 11 |
| 4,826,636 | 5/1989 | Kinney, Jr. et al. | 261/DIG. 11 |

FOREIGN PATENT DOCUMENTS

| | | | |
|---|---|---|---|
| 311638 | 3/1919 | Fed. Rep. of Germany | 261/DIG. 11 |
| 521523 | 8/1931 | Fed. Rep. of Germany | 261/DIG. 11 |
| 76983 | 11/1970 | German Democratic Rep. | 261/DIG. 11 |
| 4693 | of 1903 | United Kingdom | 261/DIG. 11 |
| 10448 | of 1908 | United Kingdom | 261/DIG. 11 |
| 450022 | 7/1936 | United Kingdom | 261/DIG. 11 |
| 528938 | 11/1940 | United Kingdom | 261/DIG. 11 |
| 841089 | 7/1960 | United Kingdom | 261/DIG. 11 |

Primary Examiner—Tim Miles
Attorney, Agent, or Firm—Pravel, Gambrell, Hewitt, Kimball & Krieger

[57] ABSTRACT

A cooling tower assembly comprising at least first and second layers of fill within the tower chamber, each of the first and second layers of fill having a source of water introduced above the fill for moving through gravity downthrough the fill during the cooling process. There is further included an upper fan member circulating at the top portion of the tower for drawing air through inlet panels along the walls of the tower through the first and second layers of fill to cool the water as it is percolating through the fill contents. The first and second layers of fill would be separated by a horizontal baffle member so that air pulled through the lower layer of fill would be prevented from the first layer, but would flow through a centrally located air flow chamber within the upper layer of fill to be drawn out of the chamber by the fan. In addition, water percolating down through the upper layer of fill would not contact the second layer of fill, but would be distributed into a water holding chamber in the lower portion of the tower via a plurality of drain pipes to prevent the overloading of water into the lower portion of fill during the water cooling process.

2 Claims, 7 Drawing Sheets

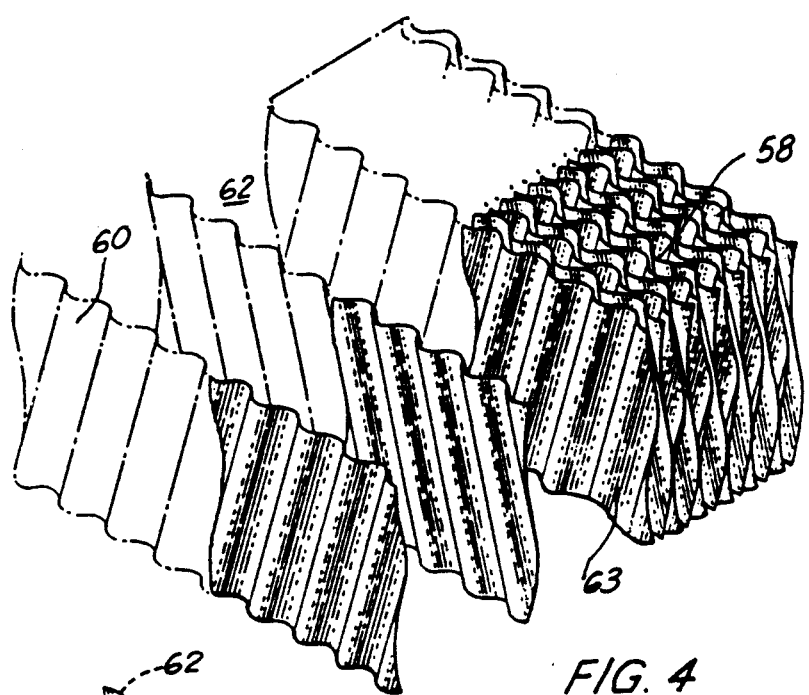
FIG. 4
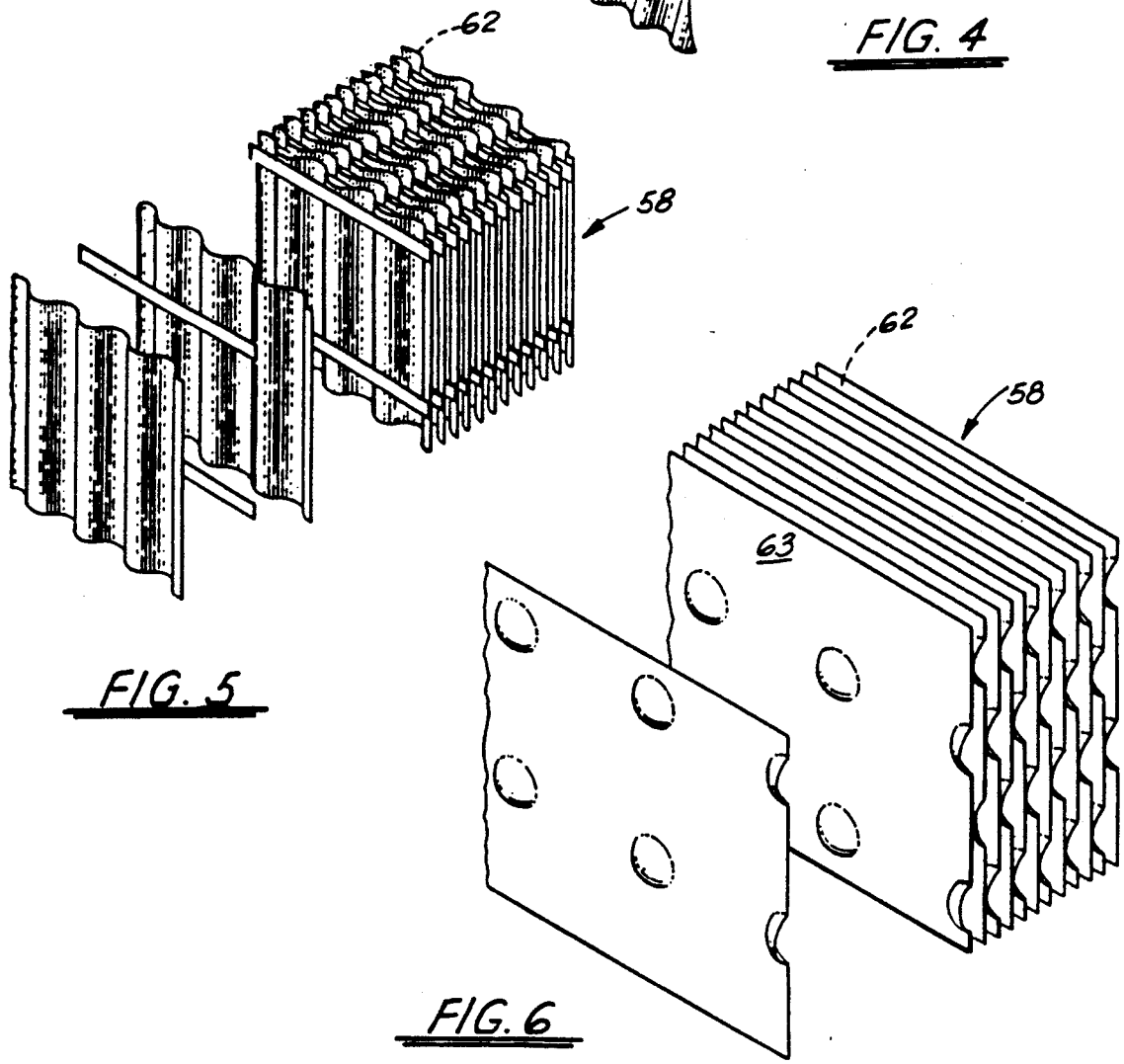
FIG. 5
FIG. 6

MULTI-LEVEL FILM FILL ASSEMBLY COOLING TOWER

This is a continuation of co-pending application Ser. No. 07/174,349 filed on Mar. 28, 1988, now abandoned. which was a Continuation-in-Part of application U.S. Ser. No. 07/071,781, filed July 10, 1987, by the same inventor which has issued as U.S. Pat. No. 4,781,869.

BACKGROUND OF THE INVENTION

1. Field of the Invention

The apparatus of the present invention relates to cooling towers. More particularly, the present invention relates to a liquid-gas counter flow film type filled cooling tower including at least a first and second layer of fill providing a multiple capability of cooling water being distributed over the fill through the counter flow of fan drawn air.

2. General Background

It is well known in the art that a conventional cooling tower comprises a counter flow type horizontal layer of fill wherein a quantity of the water to be cooled is pumped in to be distributed over the fill so that air which is drawn from below and through the fill and is drawn out of the top of the tower serves to cool the water film being distributed through the fill in order to cool the water to a reasonable temperature to be re-utilized. The conventional cross flow towers would include a single vertical fill section with the water fed from an over head source and the air being drawn therefrom air inlets at the side of the tower. A cross flow tower is inherently less efficient in the transfer of heat than is a counter flow tower based on a unit of fill. Another problem confronted with the cross flow cooling tower is that the water which is loaded onto the top of the fill reach a maximum water load, and therefore any air attempting to be drawn through the fill in order to cool the water is substantially blocked as it may flow therethrough. That being the case, the amount of water being cooled through such a conventional tower from air being drawn through the fill from the top situated fan is very limited and serves as a disadvantage in attempting to cool large quantities of water.

Several patents have issued which address the cross flow or counter flow cooling towers, the most pertinent being as follows:

U.S. Pat. No. 3,917,764 issued to Phelps, entitled "Sloped Film Filled Assembly Cooling Tower", relates to a cooling tower with the film fill assembly being on an inclined principal plane rather than the horizontal plane in order to effectuate cooling.

U.S. Pat. No. 4,048,265 issued to Fordyce, entitled "De-icing Apparatus For Water Cooling Towers Including Slotted Distribution Basin And Selectively Actuateable Valve Mechanism", relates to an apparatus for de-icing evaporative water cooling towers and permitting selective delivery of hot water from the upper distribution basin to the outer margin of the tower for de-icing of the fill structure in order to maintain adequate air flow therethrough.

U.S. Pat. No. 4,129,625 also issued to Fordyce, entitled "Selectively Controllable Water Curtain Damper For Inlet Faith Of Circular Water Cooling Tower", provides a de-icing apparatus similar to the previous Fordyce patent utilized in evaporative water cooling towers.

U.S. Pat. No. 3,880,964 also issued to Fordyce, entitled "Hot Water Supply Distribution Structure For Cooling Towers", relates to a cross flow cooling tower having fire proof liquid supply means which includes a riser opening to an overhead film adjacent a hot water distributor for suppling hot liquid to the water distributor.

U.S. Pat. No. 4,386,946 issued to Wurz, entitled "Water Cooling Tower Including A Suction Fan", the water cooling tower includes a cooling means and a suction fan further including a water catching channel around the wall of the air outlet passage at the bottom of the channel to collect water separated at and flowing along the air outlet passage channel.

U.S. Pat. No. 3,764,121 issued to Fordyce, entitled "Hyperbolic Cross Flow Cooling Tower With Basins And Fill Integrated Into Shell", teaches a type of hyperbolic cooling tower having a fill assembly structure between concrete hot water distribution and cold water basins in the tower shell adjacent the air inlet of the shell.

The remainder of the patents are also pertinent in the art:

| U.S. Pat. No. | INVENTOR | TITLE |
| --- | --- | --- |
| 3,815,334 | Kotting, et al | "Gas-Liquid Contact Device" |
| 4,460,521 | Stackhouse | "Crossflow Cooling Tower Fill Section" |
| 4,215,080 | Ribier, et al | "Liquid Collecting Device And Use Thereof In Liquid-Gas Contacting Apparatus" |
| 4,622,183 | Sonnenschein, et al | "Device For Transferring Cooling Water Of A Wet/Dry Cooling Tower To Recirculation Means" |
| 3,865,911 | Lefevre | "Cooling Tower Type Waste Heat Extraction Method And Apparatus" |
| 4,312,646 | Fattinger, et al | "Gas Scrubbing Tower" |
| 4,003,970 | Vodicka | "Combined Wet And Dry Heat Transfer System And Method For Cooling Towers" |

SUMMARY OF THE PRESENT INVENTION

The assembly of the present invention provides an improved embodiment of the multi-level film fill assembly cooling tower that was disclosed in U.S. patent application Ser. No. 071,781, by the same inventor, which is now Pat. No. 4,781,869. What is provided is a cooling tower assembly comprising at least first and second layers of fill within a circular tower chamber, each of the first and second layers of fill having a source of water introduced above the fill for moving through gravity down through the fill during the cooling process. There is further included a plurality of upper fan member circulating at the top portion of the tower for drawing air through inlet panels along the wall of the tower through the first upper and second lower layer of fill to cool the water as it is percolating through the fill contents, the interior plurality of fan members drawing air through the lowermost portion of the chamber, and the outer perimeter of fan members drawing air from the uppermost portion of the apparatus. The first and second layers of fill would be separated by a horizontal baffle member so that air pulled through the lower layer of fill would not proceed upward through the first layer, but would flow through a centrally located air flow chamber to bypass the upper layer of fill to be drawn out of the chamber by the fan. In addition, water percolating down through the upper layer of fill would not percolate down through the second layer of fill, but would be distributed into a water holding chamber at the lower portion of the tower via a plurality of drain pipes bypassing the lower level of fill to prevent the overloading of water into the lower portion of fill during the water cooling process.

Therefore, it is a principal object of the present invention to provide a circular water cooling tower assembly including multi-layered of fill for increasing the cooling capacity of the tower;

It is still a further principal object of the present invention to provide an improved water cooling tower assembly having an upper layer of fill and a lower layer of fill, the layers of fill separated so that water percolating down through the upper layer does not flow into the lower layer but flows into the water holding chamber at the floor of the tower;

It is still a principal object of the present invention to provide a water cooling tower assembly which includes multiple layers of fill, but maintains an equal air flow distribution between the upper layers and lower layers of fill, to prevent overloading of either the first or second layers of fill;

It is still a further object of the present invention to provide a multi-section water cooling tower assembly which includes a first upper section having air drawn therethrough from an outer perimeter of fans, and a lower section having air drawn therethrough from an interior perimeter of fans, the outer and lower sections isolated from one another therefrom; and It is still further object of the present invention to provide a water cooling tower assembly which enables the assembly to accommodate a substantial increase in the quantity of water distributed and cooled through the cooling tower during the cooling process.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIGS. 4, 5 and 6 represent overall exploded views of the conventional type fill that is utilized in the preferred embodiment of the apparatus of the present invention;

DETAILED DESCRIPTION OF THE PREFERRED EMBODIMENT

Figure 1:
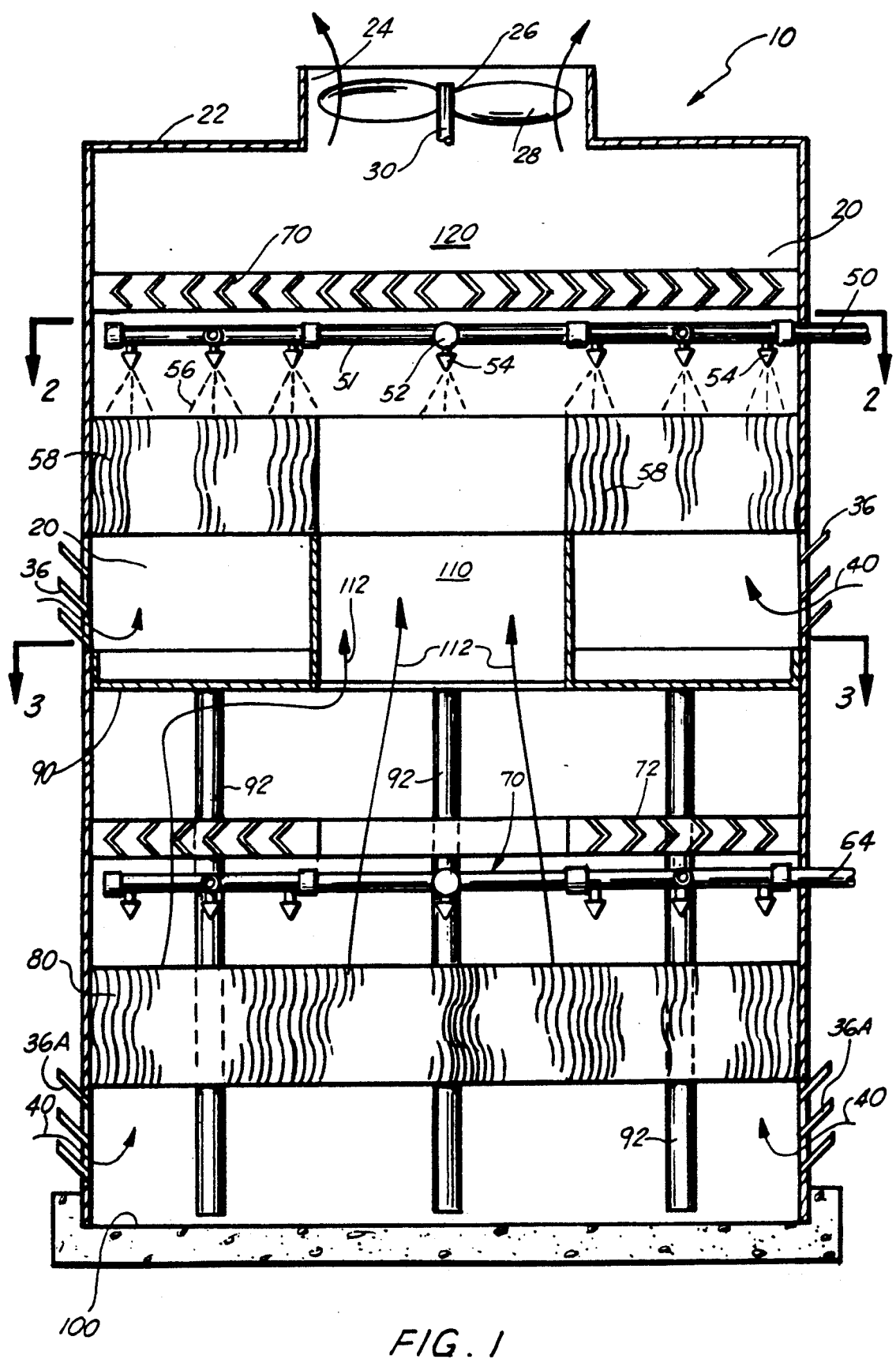
FIG. 1 represents a cross-sectional view of the overall embodiment of the apparatus of the present invention.

FIGS. 1-7 represent the preferred embodiment of the apparatus of the present invention of a cooling tower assembly 10. Cooling tower assembly 10 is substantially comprised of a closed wall substantially rectangular shaped cooling tower frame 11, including upright walls 12, 14, 16, and 18, with the upright walls 12, 14, 16, and 18, defining a closed water cooling tower chamber 20 therewithin, of the type of cooling tower known as a conventional counter flow cooling tower, in which water containing substantial heat is percolated down through the tower and air is drawn through the tower to cool the water as it percolates through the tower.

The cooling tower frame 11 would further include a top portion 22, which would substantially define a means for sealing off the upper portion of the tower 10, with the top portion 22 including a centrally located air flow channel 24 housing a fan 26, with the fan 26 including a plurality of of vanes 28 whereby rotation of the fan 26 via shaft 30, would draw air through chamber 18, in the direction of Arrows 32, as will be discussed further.

Walls 12, 14, 16, and 18, further include a first upper plurality of air inlet panels 36 which are located along the length of each wall portion, at strategic points along the wall portion, so that air drawn in through the air inlet panels 36 in the direction of Arrows 40, flow through a portion of fill in order to serve the cooling purpose. In addition, as illustrated, the preferred embodiment of cooling tower 10 also includes a second lower series of air inlet panels 36A which serve a similar purpose to allow air flow 40 to enter tower 10, but at a different area in the tower 10, crucial to the overall invention.

Turning now to the internal contents of tower 10, as seen specifically in the Figures, tower 10 would include an upper principal water inlet line 50 which would serve to introduce water containing an undesirable quantity of heat therein, to be removed by the tower during operation. As seen particularly in FIG. 2, water inlet line 50 would form a substantially rectangular pattern of internal water line 51 within the confines of tower 10, including a plurality of spigot pipes 52 emanating therefrom, so that water could be distributed throughout the confines of the internal chamber 20 of tower 10 via water nozzles 54 as seen in cross-sectional view of FIG. 1. Water (as seen in lines 56), which is being distributed from nozzles 54 would fall into a first upper layer of fill 58, which, in the preferred embodiment, as illustrated in FIGS. 4-6, may constitute a plurality of corrugated metal elements 60, having a flow space 62 therethrough, so that water flowing through fill 58 would form a "film" along the surface 63 of each plate 60, to provide a greater surface area for the air to contact the water in order to cool it as it flows through upper layer of fill 58. This combination would constitute the first means for cooling the water flowing through tower 10 during operation.

Figure 2:
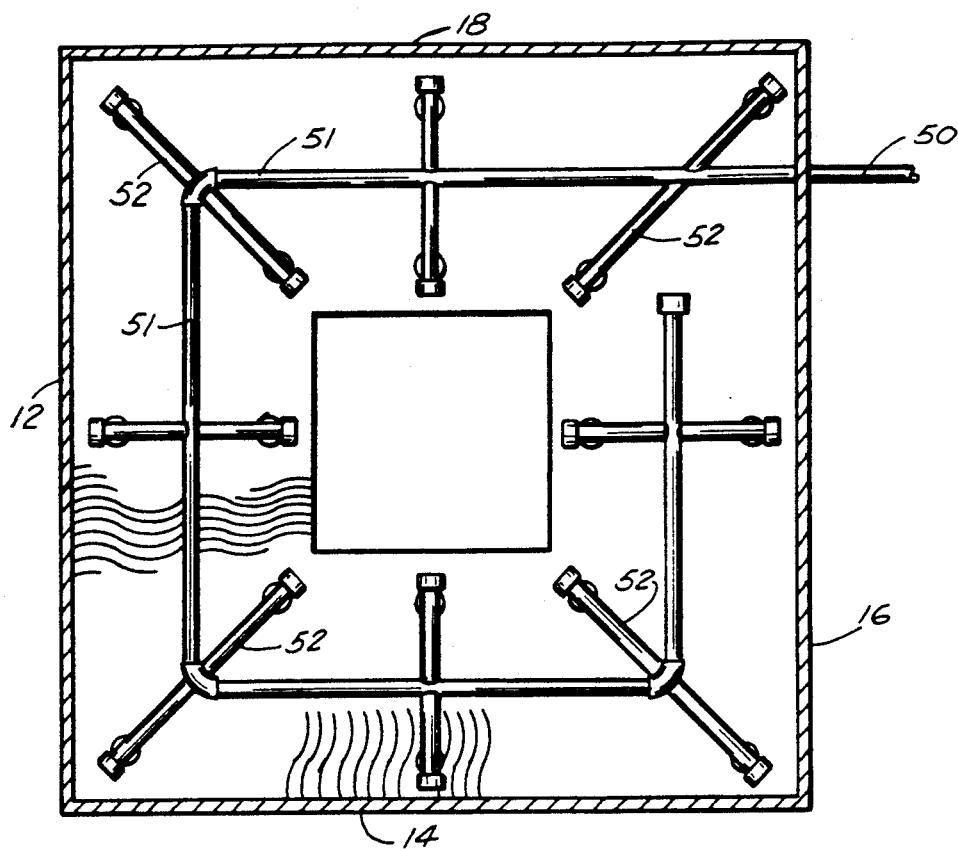
FIG. 2 represents a cross-sectional view along lines 2—2 in FIG. 1 of the preferred embodiment of the apparatus of the present invention.
Figure 3:
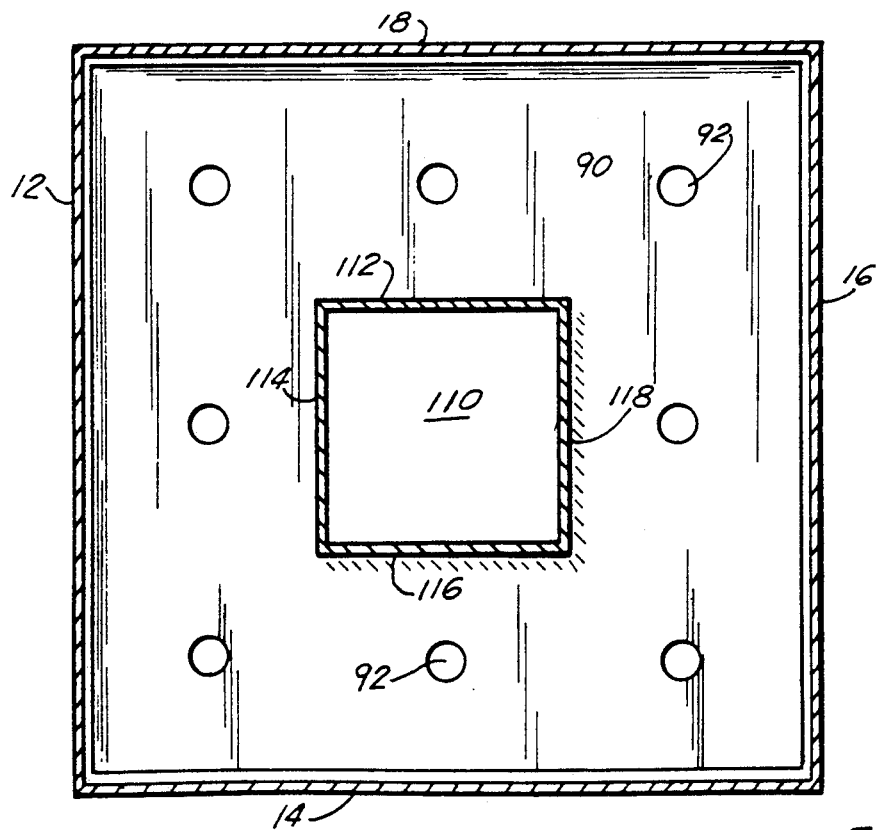
FIG. 3 represents a cross-sectional view along lines 3—3 in FIG. 1 of the preferred embodiment of the apparatus of the present invention.

In addition, there is illustrated in FIG. 1, a second lower water inlet pipe 64, which like upper pipe 50 allows the introduction of water into the lower portion of tower 10, utilizing an identical water distribution assembly as was previously illustrated in FIG. 2, with the lower distribution of water assembly 70 likewise flowing through a second lower section of fill 80, again, the fill in the preferred embodiment constituting the type of fill that would be contained in the upper layer of fill as illustrated in FIGS. 4-6, and allowing again a second distribution of water into the tower for cooling therethrough. Therefore, it is seen that in this multiple layer cooling tower of the present invention, a capacity of water flowing therethrough that is cooled may be doubled in the process in this novel arrangement, and may in fact include additional layers of fill to provide a multiple layer of fill cooling tower assembly. In addition, as seen in FIG. 1, cooling tower assembly would include a first upper assembly of droplet eliminators 70 and a lower assembly of droplet eliminators 72 which would prevent movement of water into the plenum chamber 20 as air is forced upward through the fill layers 58 and 80 respectively. This is a conventional structure in these types of cooling towers.

Reference is now made to the Figures to illustrate the means by which the water flowing through the upper layer of fill 58 is prevented from flowing into the lower layer of fill 80, to prevent overload in the distribution of water therefrom. This means includes a lower horizontally located baffle plate 90 which is substantially positioned a distance below the upper portion of fill 58, so that any water existing the upper layer of fill 58 flows onto the upper surface of baffle plate 90, is prevented from flowing past the plate 90 into the lower level of fill 80. This prevents the overloading of water percolating downward through the lower level of fill 80 and overloading that level. Further, plate 90, as is illustrated in FIG. 1, is provided with a plurality of downward depending flow pipes 92, which serve to allow any water flowing onto baffle 90 to flow down flow pipes 92 into the lower floor portion 100 of cooling tower 10, with each of the flow pipes 92 flowing through and bypassing the lower portion of fill 90, and not allowing any water from the upper portion of fill 58, which is percolated onto baffle plate 90, to make contact or to interfere with the water flowing through lower fill 180. As with any cooling tower, any water which has been cooled and is flowing onto the floor portion 100 of tower 110 is evacuated from tower 10 via a pumping means (not illustrated) so that the water may be redistributed through the system after the water has undergone cooling.

Figure 8:
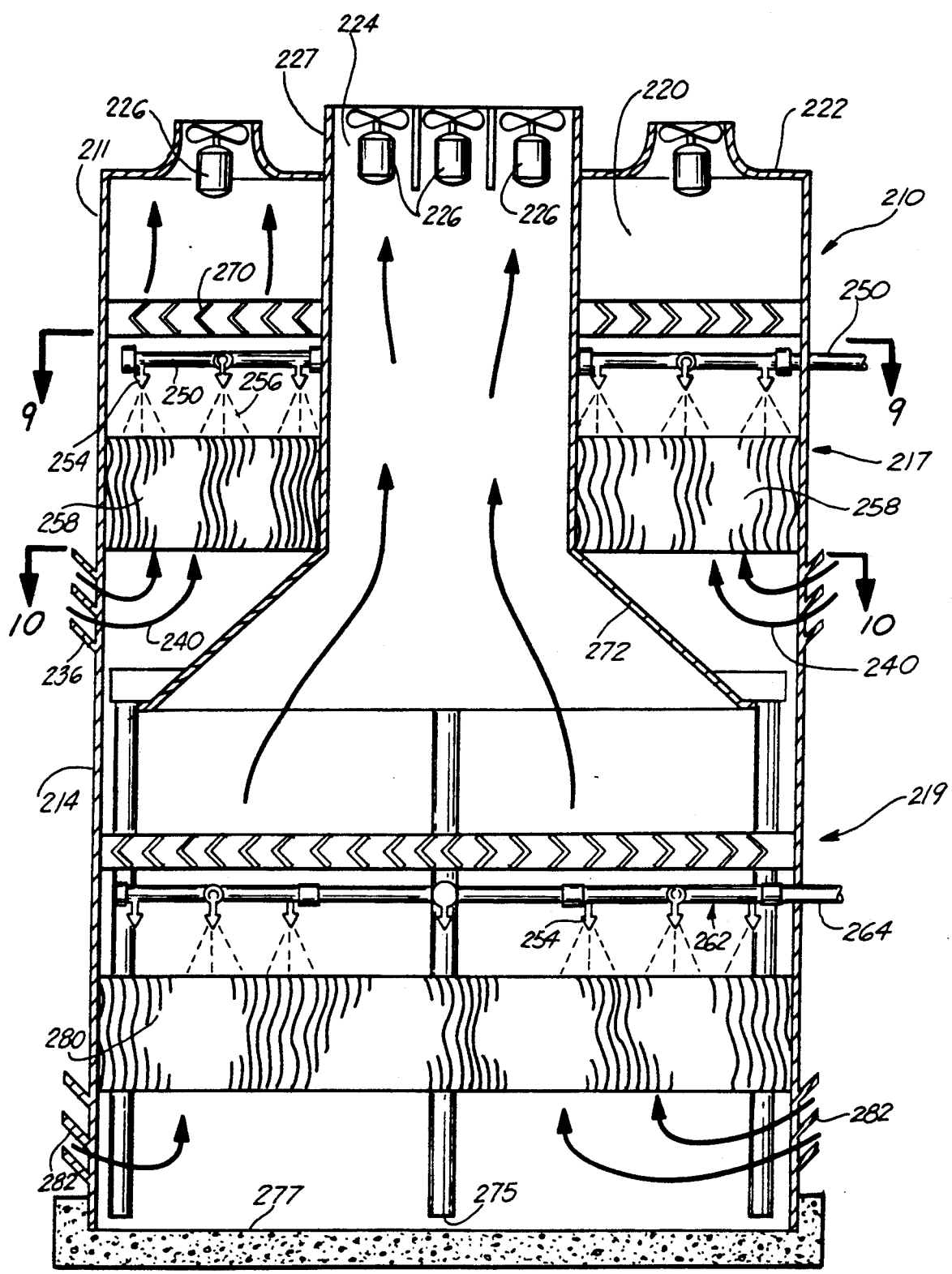
FIG. 8 provides an elevational cross-sectional view of the additional embodiment of the apparatus of the present invention.
Figure 10:
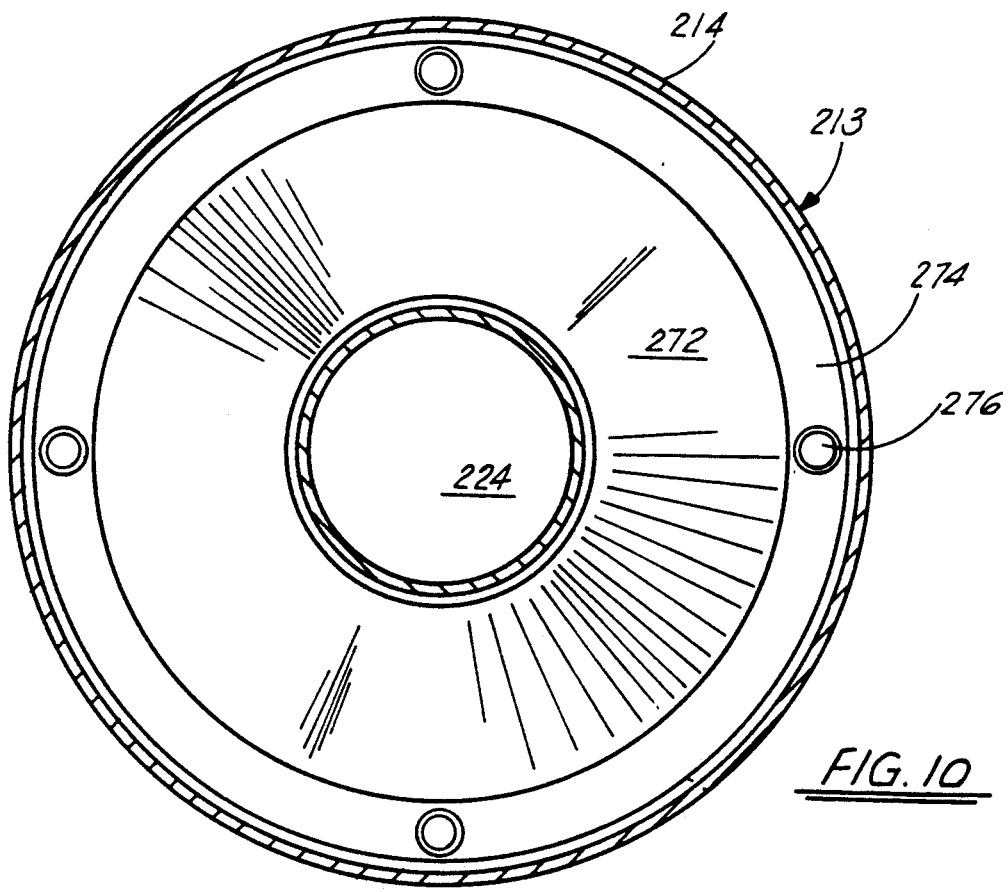
FIG. 10 provides a cross-sectional view along lines 10—10 of the embodiment of the apparatus of the present invention as is illustrated in FIG. 8.

The system further includes a means for allowing air which is drawn upward through the lower level of fill 80 after having picked up a quantity of heat from the water cooled therein, from making contact with the upper layer of fill 58 so that the upper layer of fill 58 serves as a cooling means for the water having percolated therethrough as efficiently as possible. This means includes an internal air flow channel 110, as illustrated in FIGS. 8 and 10, defined by annular wall 14, the side walls serving to prevent air flowing into tower 110 through panels 36A, upward through lower fill layers 80 to contact the upper fill layer 58, since the four side walls are integrally attached to the floor portion 100, and serves as a means to direct air flow 12, after flowing through the lower fill 80, to encounter the baffle member 90, and to be directed into the internal air flow channel 10, past the upper layer of fill 58, and up into air plenum chamber 120 to be drawn out of tower 110 via fan 26.

It should be noted as seen in FIG. 1, that the fill contained in lower fill layer 80 spans the entire internal tower space 20 with the exception of the intrusion of downward depending flow pipes 92 which are directed through lower fill 180 to deposit water flowing from upper fill 58. This is unlike upper fill portion 58 which includes the internally located air flow chamber 110 for directing air upward through the tower without the air flowing through the lower space 80 to make contact with the upper fill 58.

It is therefore foreseen that this type of cooling tower would allow the introduction of a greater quantity of water into the tower 10 to be cooled by at least two, although not limited to two layers of fill 58 and 80 in the tower, in such a manner that the water flowing downward through the upper layer of fill 58 does not contact and flow into the lower of fill 80, thus preventing any possibility of overload of the lower layer of fill due to the water that may percolate downward through the upper nozzle water distribution assembly 51. In addition, this novel assembly would allow any air flowing upward through the system which may have picked up heat from the water in the lower level of fill 80 not to flow through the upper layer of fill 58 and perhaps result in less cooling of the water in the upper layer 58 due to the fact that the air has been overheated from its passage to the lower level of fill 80. This novel combination allowing the distribution of water through the system in such a manner effectuates a greater cooling capacity, and is therefore quite novel in the art. For purposes of construction, the construction of cooling tower 110 would be constructed of conventional materials and in particular, the type of fill that may be used in the tower 10 does not necessarily restrict it to the types of fill as illustrated in the Figures, but may be of any type of fill that would allow water to percolate downward therethrough to be cooled by air drawn up through the fill during the process. Although the water film type of fill is stipulated in the drawings, the patent should not be limited to this type of fill and should allow the use of additional types of fill that may be utilized in the present state of the art or in the future.

Figure 7:
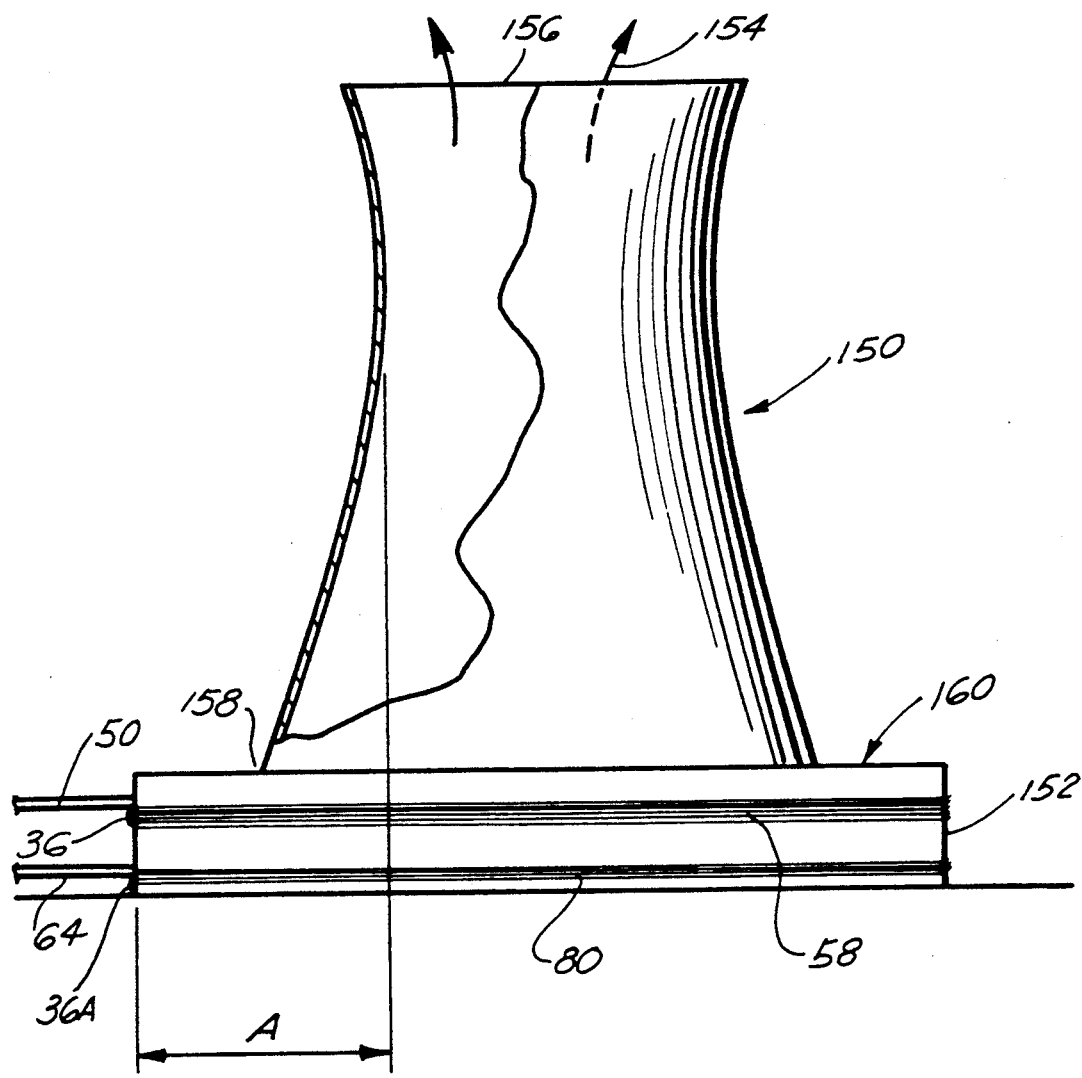
FIG. 7 represents cross-sectional cut-away representational view of a hyperbolic cooling tower which may utilize the preferred embodiment of the apparatus of the present invention.

FIG. 7 illustrates the type of cooling tower 50 which is known in the art as a hyperbolic cooling tower and in effect would allow air drawn from the lower portion of the tower structure 52 into the base of the tower to flow upward in the direction of Arrows 54 out of the open top end portion 56 of tower 50. Unlike the cooling tower construction in the preferred embodiment, a hyperbolic cooling tower of this sort does not contain a fan means, yet works upon the principle of the hyperbolic shape of the tower increasing the flow of air from the lower portion 158 to the upper portion 156 of the tower through the natural upward flow of hot air drafting therethrough.

Therefore, for purposes of construction, it should be noted that the lower rectangular portion 160 of tower 150, as seen in FIG. 7, would represent in effect the type of rectangular configuration that is found in the tower 10 in the preferred embodiment, but yet not including the fan 26. Therefore, as represented in FIG. 7, there would be included the upper inlet water line 50, the lower inlet water line 64, the upper series of inlet panels 36, the lower inlet panels 36A, and the upper fill portion 58, and the lower fill portion 80. Therefore, the means by which the air is drawn through the tower 150, as was explained earlier, is through the hyperbolic action of the air, yet the construction and functioning of the lower portion 160 as seen in FIG. 7 would be in effect identical to the functioning of the tower as seen in the preferred embodiment. Although it is not clearly illustrated in FIG. 7, that portion of the Figure designated as "A" could represent a cross section of that portion 160 of the tower as is illustrated in FIG. 1. This cross section would of course include the upper internal air channel 110 for allowing air flow to bypass the upper fill layer 58, and would include the downward depending water drain pipes 92 that would bypass the lower fill layer 80 in order to drain off the water percolating through upper fill 58.

FIGS. 8–11 illustrate an additional embodiment of the apparatus of the present invention as illustrated by the number 210. Like principal embodiment apparatus 10, apparatus 210 would include a cooling tower assembly 211, which comprises a circular structure 213 having a continuous annular wall portion 114 which defined a closed water cooling tower chamber 220 therewithin, in which, as with the preferred embodiment, water containing substantial heat would be percolated down through the tower and air would be drawn through the tower to cool the water as it percolates therethrough. The cooling tower 213 would further include a top portion 222, for defining a means for sealing off the upper portion of tower 213, with the top portion 222 including a centrally located air flow channel 224, housing a plurality of fans 226, the fans configured in a configuration as is illustrated in FIG. 8, fans 226 arranged in a pattern substantially whereby six fans 226 would be located around the exterior of the wall 227 of air channel 224, in a centrally located fan 226 in the center portion of the air channel 224. It should be noted that the configuration due to the presence of the other fans 226, as will be discussed further, the configuration of wall 227 enclosing air channel 224 is an annular configuration to enable a maximum number of fans 226 within the entire top portion 222 of tower 213 as will be discussed further. As seen in FIG. 8, the additional fans 226 are positioned around the outer perimeter of the top portion 22 of tower 213, in such a fashion as to create the maximum amount of air that will be pulled through the top 222 of tower 213 in the direction of Arrows 115 during the operation of the apparatus.

As seen in FIG. 8, apparatus 210 is substantially divided into an upper air cooling section 217 and a lower air cooling section 219, both of which allows the cooling of water in the apparatus separate and independent of the cooling of water from the second section. Upper section 217 would include a first plurality of air inlet panels 236 situated along continuous wall 214, so that air drawn into the upper section 217, via the rotation of fans 226 exterior of wall 224, and would have the air drawn into the air inlet panels 236 upward in the direction of Arrow 240. Intermediate the fans 226 and the air inlet panels 236 there would be included a principal water inlet line 250 which would serve to introduce water containing undesirable quantity of heat to be removed by the tower during operation. As seen particularly in FIG. 8, water inlet line 250 would form a substantially circular pattern of internal water lines 251 within the confines of space 220, including a plurality of spigot pipes 252 emanating therefrom, so that water could be distributed throughout the confines of the internal chamber 220 of tower 210 via water nozzles 254 as is illustrated in FIG. 8. Water, as seen via lines 256 which is being distributed from nozzles 254 would flow into the upper layer of fill 258, which, in the preferred embodiment would be the same type of fill as would be illustrated in FIGS. 4–6 and as was discussed earlier in the specification. In addition, there would be included, as with the preferred embodiment circular splash plate 270 located intermediate the water inlet line 250 and the fans 226 so as to prevent any flow of water upward as the flow of air passes through fill 258 during its flow out of apparatus 210 through top 222. Thus, upper chamber 217 would have the ability to have air enter panels 236 flowing through fill 258 which is cooled by the flow of water 256 and up through the outer perimeter of fans 226 as the first upper cooling section of the apparatus; in a counterflow configuration.

Turning now to the lower cooling section 219, there is illustrated, in FIG. 8, a second lower water distribution assembly 262, including inlet pipe 264 which like upper pipe 250 allows the introduction of water into the lower portion 219 of tower 210, utilizing an identical water distribution assembly as was previously illustrated in FIG. 8, with the lower distribution of water assembly 262 likewise flowing through a second lower section of the fill 280. Again the fill in this embodiment constituting the type of fill that would be contained in the upper layer of fill 258, and allow again a second distribution of water into the section 219 of tower 210 for cooling therethrough. Likewise, there would be included a second lower droplet eliminator 271 for preventing any flow of water upward as the water is percolated downward through fill 280.

As seen in FIG. 8, the water percolating down through upper fill layer 258 would be isolated from the lower section 219, via annular baffle 272, illustrated in cross-section in FIG. 10. As seen in the Figures, therefore any water percolating downward through upper fill 258 would encounter incline baffle 272, and move to the outer perimeter of annular drain portion 274, and be received by a plurality of drainage pipes 276 which would direct the water downward out of their lower end portion 275 onto floor portion 277.

As seen in the Figures, annular baffle 272 at its upper most end is connected directly to the annular wall 227 surrounding the central flow port 224, so as to isolate the air movement between the upper and lower sections as will be described further.

Figure 9:
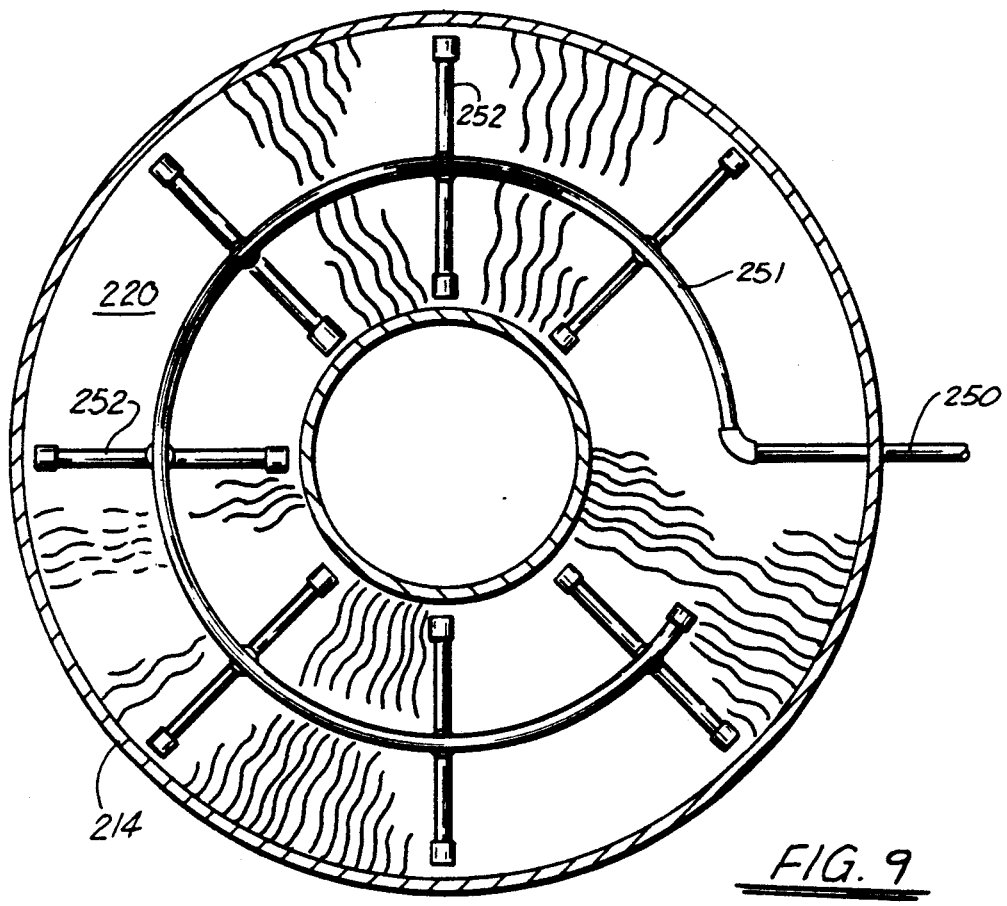
FIG. 9 provides a cross-sectional view along lines 9—9 in FIG. 8 of the embodiment of the apparatus of the present invention.

Turning now to the lower pool of section 219, there is provided again a primary water distribution section 262 having a water inlet 264 which would be identical to the water distribution system of the upper portion as seen in cross-section in FIG. 9. Therefore, the detailed review of the system will not be necessary at this point. Additionally, there is included directly below the plurality of water nozzles 254, a second layer of fill 280, which again would allow water flowing downward from nozzles 254 to percolate downward to lower fill 280 likewise onto the floor portion 277 of the apparatus 210. As with the upper section, there is further included a plurality of air inlet panels 282, which would receive air drawn by fans 226 in the upper portion. It should be noted that as was described earlier, the plurality of fans 226 contained within the confines of space 224 as defined by the annular wall 227 within the apparatus, would confine the air being drawn by fans 226 for that air being received through panels 282, therefore would be isolated from the upper portion of air being drawn through panels 236. Therefore, in this particular embodiment the series of fans contained intermediate the outer wall 214 and the interior wall 227 would draw air through the upper portion of the apparatus through panels 236, while the fans 226 contained within the annular space confined by annular wall 227 would draw air through the lower panels 282 through the lower fill 280 to cool the water being introduced by the lower water system.

Figure 11:
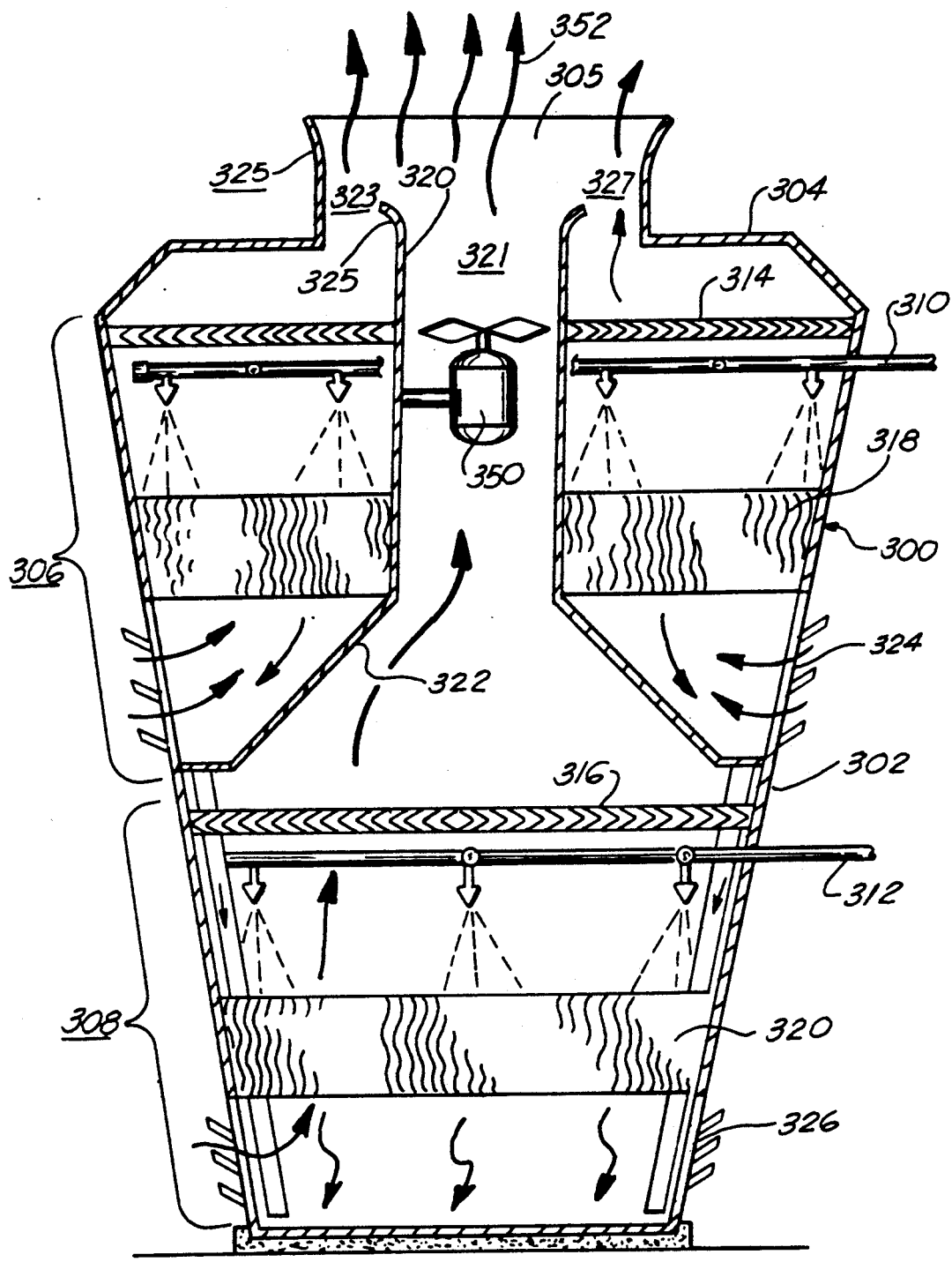
FIG. 11 provides a cross-sectional view of an additional embodiment of the apparatus of the present invention contained within a conically shaped modified hyperbolic cooling tower.

Turning now to a third embodiment as seen in FIG. 11, there is provided a conically shaped tower 300 having an annular side wall 302, a top portion 304 with a central annular opening 305. In this particular embodiment, there is likewise included an upper cooling system 306 and a lower cooling system 308. Each of the cooling systems providing a water inlet system 310 and 312 respectively, of the type as illustrated in FIG. 8, with an upper splash plates 314 and 316 respectively, and lower fill sections 318 and 320 respectively. As with the embodiment as illustrated in FIGS. 8-10, the upper system would be isolated from the lower system via centrally located flow tube 320, leading into angulated baffle 322 so that water and air introduced into the upper system would be introduced via flow panels 324 and air being introduced into the lower system would be introduced via flow panels 326, with each of the systems cooling the water flow through the fill through a counter flow system as seen in the preferred embodiment.

However, in this particular embodiment, there is provided a single fan 350 located within the flow channel 321 of central flow line 320, so that fan 350 would draw air from lower panels 326 through lower fill 320 and up through the confines of annular flow bore 321 out through the tower as seen in the direction of Arrows 352.

However, as seen in the Figures, the system would not include a series of fans around the outer perimeter of flow tower 320. The flow of air through the upper system 306 would be accomplished by a draft as created by the air being drawn through the tower via fan 350, so that a "vacuum" in effect would be had within annular space 323 between the upper end portion 325 of flow tower 321 and the upper exit flow tower 325, so that the air for the upper system would be drafted up through upper fill 318 and out of the principal flow tower 325 as seen in the Figure. Therefore, with economics of a single fan positioned as seen in FIG. 11, the entire system could create an air flow through upper and lower panels to be cooled through the upper and lower systems of this particular embodiment.

What follows are tables which illustrate a comparison of a conventional counter flow cooling tower which illustrates a comparison of the efficiency of a conventional counter flow cooling tower as seen in table I with the multi-level cooling tower of the present invention as illustrated in table II.

Turning to table I it should be noted that in a conventional tower which would have a water flow rate of 6100 gallons per minute, an inlet temperature of 111.5° F. and exit temperature of 87° F., with a cell length of 42' and a cell width of 30', with a fill height of 7', in order to achieve a 97.2% capacity, the total horse power required would be 136.1158.

As compared against the present invention in table II, utilizing the exact specifics of water flow rate, inlet temperature and exit temperature, with a cell length of 78' rather than 42' due to the doubling of the cell capacity, and a fill height of 5', the total horse power required to achieve 126.6% capacity is 61.62521. Thus, from a comparison of the conventional vis-a-vis the present invention, it is clear that the present invention that these computer runs illustrates a thoroughly more efficient unit.

TABLE I

PROGRAM CTRFLO - COUNTERFLOW DESIGN/EVALUATION; INPUT DATE REPRINT
PROJECT DESCRIPTION tower # 23 EXXON

| | | |
|---|---|---|
| ANALYSIS | 1 | |
| INLET TEMPERATURE | 111.5 | Degrees °F. |
| EXIT TEMPERATURE | 87 | Degrees °F. |
| WET BULB TEMPERATURE | 82 | Degrees °F. |
| WATER FLOW RATE | 6100 | Gal/Min. |
| ELEVATION | 48 | Feet |
| DISSOLVED SOLIDS | 0 | |
| FILL TYPE CODE | 2 | |
| 14' VELOCITY RECOVERY STACK | 1 | |
| PRINTOUT CODE | 0 | |
| NO. OF CELLS | 1 | |
| CELL LENGTH | 42 | Feet |
| CELL WIDTH | 30 | Feet |
| FILL HEIGHT | 7 | Feet |
| FAN DIAMETER | 20 | Feet |
| EXISTING BHP | 125 | Horsepower |

COOLING TOWER EVALUATION

L/G 1.215626
KaV/L 2.627197
Q/A 4.84127
ACMF PER FAN 631048.4
EXIT AIR TEMP, °F. 99.84123
STATIC PRESS, IN H2O .9143869
VELOCITY, FPM 500.8321
CHP 1.083759
REQUIRED BHP 136.1158
TOTAL HP REQUIRED 136.1158 THE % CAPACITY IS 97.202295

TABLE II

PROGRAM CTRFLO - COUNTERFLOW DESIGN/EVALUATION: INPUT DATE REPRINT
PROJECT DESCRIPTION tower # 23 EXXON

| | | |
|---|---|---|
| ANALYSIS | 1 | |
| INLET TEMPERATURE | 111.5 | Degrees °F. |
| EXIT TEMPERATURE | 87 | Degrees °F. |
| WET BULB TEMPERATURE | 82 | Degrees °F. |
| WATER FLOW RATE | 6100 | Gal/Min. |
| ELEVATION | 48 | Feet |
| DISSOLVED SOLIDS | 0 | |
| FILL TYPE CODE | 2 | Film Fill |
| 14' VELOCITY RECOVERY STACK | 1 | |
| PRINTOUT CODE | 0 | |
| NO. OF CELLS | 1 | |
| CELL LENGTH | 42 | Feet |
| CELL WIDTH | 30 | Feet |
| FILL HEIGHT | 7 | Feet |
| FAN DIAMETER | 20 | Feet |
| EXISTING BHP | 125 | Horsepower |

COOLING TOWER EVALUATION

L/G 1.215626
KaV/L 2.627197
Q/A 4.84127
ACMF PER FAN 631048.4
EXIT AIR TEMP, °F. 99.84123
STATIC PRESS, IN H2O .9143869
VELOCITY, FPM 500.8321
CHP 1.083759
REQUIRED BHP 136.1158
TOTAL HP REQUIRED 136.1158 THE % CAPACITY IS 97.202295

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A multi-level counterflow cooling tower assembly, comprising:
   a) a continuous annular wall portion, defining an interior chamber substantially circular in cross-section;
   b) a first air inlet opening along a portion of the continuous wall portion, for allowing air to flow into the interior chamber;
   c) a first water inlet for introducing water flow into the chamber at a point above the first air inlet opening;
   d) a first layer of fill means positioned intermediate the first air inlet opening and the first water inlet for receiving water flow therethrough as water flows into the fill means from the first water inlet;
   e) at least a second air inlet opening positioned in the wall of the chamber below the first air inlet opening;
   f) a second inlet means above the second air inlet opening for introducing water into the chamber;
   g) at least a second layer of fill means intermediate the second air inlet opening and the second water inlet means for receiving water flowing from the second water inlet means;
   h) a plurality of flow pipes through the second layer of fill means;
   i) a substantially circular baffle member positioned between the first layer of fill means and the second air inlet opening for channeling water flowing downward through the upper layer of fill means into the plurality of flow pipes into a floor portion of the chamber, to prevent the water from making contact with the second layer of fill means during operation; and
   j) fan means positioned substantially at the upper portion of the chamber for drawing the air entering the first and second air inlet openings upward through the first and second layers of fill means counter to the downward flow of water through the first and second layers of fill means in order to cool the water.

2. A multi-level counterflow cooling tower assembly, comprising:
   a) a continuous upright wall portion for defining a chamber therewithin substantially circular in cross-section;
   b) baffle means for separating the chamber into a first upper chamber, and a second lower chamber;
   c) air inlet means in the wall of the upper chamber;
   d) fluid inlet means above the air inlet means for introducing water into the upper chamber;
   e) fill means positioned intermediate the air inlet means and the water inlet means for allowing water to percolate downward through the fill means;
   f) fan means in the upper chamber for pulling the air entering the air inlet means upward through the fill means, to cool the water as the water percolates downward through the fill means;
   g) second air inlet means positioned substantially at the base of the lower chamber;
   h) water inlet means positioned above the second air inlet means for introducing water into the lower chamber;
   i) second layer of fill means positioned intermediate the second air inlet means and the second water inlet means;
   j) second fan means for pulling air that is entering the second air inlet means up through the second layer of fill means in order to cool the water that is percolating downward through the second layer of fill means; and
   k) air channel means bypassing the upper chamber, for channeling the air from the lower chamber upward into the second fan means and out of the chamber.

* * * * *